United States Patent [19]

Ostrow

[11] Patent Number: 4,612,079

[45] Date of Patent: Sep. 16, 1986

[54] LABEL APPLICATOR WITH PIVOTABLE LABELING HEAD

[75] Inventor: Robert L. Ostrow, Santa Ana, Calif.

[73] Assignee: Label-Aire, Inc., Fullerton, Calif.

[21] Appl. No.: 634,465

[22] Filed: Jul. 25, 1984

[51] Int. Cl.[4] .............................................. B32B 35/00

[52] U.S. Cl. .................................... 156/497; 156/540; 156/541; 156/542; 156/DIG. 37; 156/DIG. 38

[58] Field of Search ............... 156/497, 540, 541, 542, 156/DIG. 37, DIG. 38

[56] References Cited

U.S. PATENT DOCUMENTS

| | | | |
|---|---|---|---|
| 3,729,362 | 4/1973 | French et al. | 156/541 |
| 4,124,436 | 11/1978 | Pettis et al. | 156/DIG. 37 |
| 4,255,220 | 3/1981 | Kucheck et al. | 156/497 |
| 4,475,978 | 10/1984 | Bartl | 156/497 |

*Primary Examiner*—Caleb Weston
*Attorney, Agent, or Firm*—Gordon L. Peterson

[57] ABSTRACT

A label applicator for labeling an article comprising a supporting structure, a label receiver mounted on the supporting structure for movement along a path between a label dispensing station and a label applying station and for rotational movement about an axis to control the angular orientation of the label, and a label dispenser for moving a label onto the label receiver at the label dispensing station. The label is releasably retained on the label receiver, and the label receiver is moved along the path between the stations. The label receiver is rotated about the axis so that the angular orientation of the label relative to the article can be controlled.

13 Claims, 3 Drawing Figures

LABEL APPLICATOR WITH PIVOTABLE LABELING HEAD

BACKGROUND OF THE INVENTION

In a conventional label applicating process, a label applicator applies labels to articles as the articles are advanced through a label applying station. The labels can be transferred from the label applicator to the articles by tamping, air pressure, or a combination of the two. A label applicator of this general type is shown in Kucheck et al U.S. Pat. No. 4,255,220.

It is sometimes necessary or desirable to angularly orient the label on the article. For example, in labeling certain articles cut from cloth or other kinds of sheet material, a label applicator can be mounted on a traversing mechanism and sequentially positioned over each of the parts to be labeled. In this event, it is important to angularly orient the label for each of the parts or articles to be labeled, and each such orientation may be different from the preceding orientation.

One label applicator having some ability to angularly orient a label is shown in Pettis et al U.S. Pat. No. 4,124,436. In that label applicator, a label is retained on one vacuum foot, and a rotatable vacuum foot is advanced through the first vacuum foot to pick up the label and transfer it to an article to be labeled. The adjustments in the amount of rotation of the rotatable vacuum foot are quite limited and are not infinitely adjustable. In addition, the patented construction is relatively complex in various respects, including the requirement for two separate vacuum feet and the necessity for transferring the label from one vacuum foot to the other.

SUMMARY OF THE INVENTION

This invention overcomes these disadvantages. With this invention, the label is dispensed onto a rotatable label receiver which transfers the label to the article to be labeled. Thus, there is no need to transfer the label to a second label receiver. In addition, the degree to which the label receiver can rotate is infinitely adjustable.

A label applicator constructed in accordance with the teachings of this invention may comprise a supporting structure and a label receiver mounted on the supporting structure for rotational movement about a rotational axis to control the angular orientation of the label relative to the article to be labeled. The label receiver has a label receiving face onto which label dispensing means dispenses a label, and the axis of rotation is preferably generally transverse to the label receiving face. The label is releasably retained on the label receiving face, and the label receiver is rotated about the axis so that the label can be angularly oriented and transferred to the article.

With this invention, the label dispensing means moves the label directly onto the movable label receiver at a label dispensing station, and this eliminates the need to transfer the label from a stationary vacuum foot to a movable vacuum foot as in the construction shown in the Pettis et al patent. Preferably, the label receiver is held stationary at the label dispensing station relative to the supporting structure while the label dispenser moves the label onto the label receiver. The label receiver can then apply the label directly to the article without transferring the label to a second label receiver.

Preferably, the label receiver is also mounted on the supporting structure for movement along a path between a label dispensing station and a label applying station. This enables the label receiver to move into close proximity to the article to be labeled prior to transferring the label to the article. Preferably the path is linear, and the rotational axis is parallel to, or coincident with, the path. In one preferred construction, the path and axis are vertical.

This can be conveniently implemented by using label receiver mounting means which includes a carriage, means for mounting the label receiver on the carriage for rotational movement about the rotational axis relative to the carriage and means for mounting the carriage for movement to move the label receiver between the two stations. The label receiver can advantageously be rotated by a motor carried by the supporting structure. The carriage moves relative to the motor in moving the label receiver to the label applying station, and the motor is appropriately drivingly coupled to the label receiver in a way to accommodate this movement of the carriage along the path.

In order to have sufficient room for the various components of the label applicator, which may include a printer, and to allow the label dispensing means to come into proximity to the label receiver, it is preferred to radially offset the label receiver and a portion of the means for rotating the label receiver. For example, the motor may drive a shaft which is radially offset from the rotational axis of the label receiver. This shaft may extend through the carriage and be splined to accommodate movement of the carriage along the path. This shaft may be suitably drivingly coupled to the label receiver by means which includes an endless flexible member.

The invention, together with additional features and advantages thereof, may best be understood by reference to the following description taken in connection with the accompanying illustrative drawing.

DESCRIPTION OF THE PREFERRED EMBODIMENT

Figure 1:
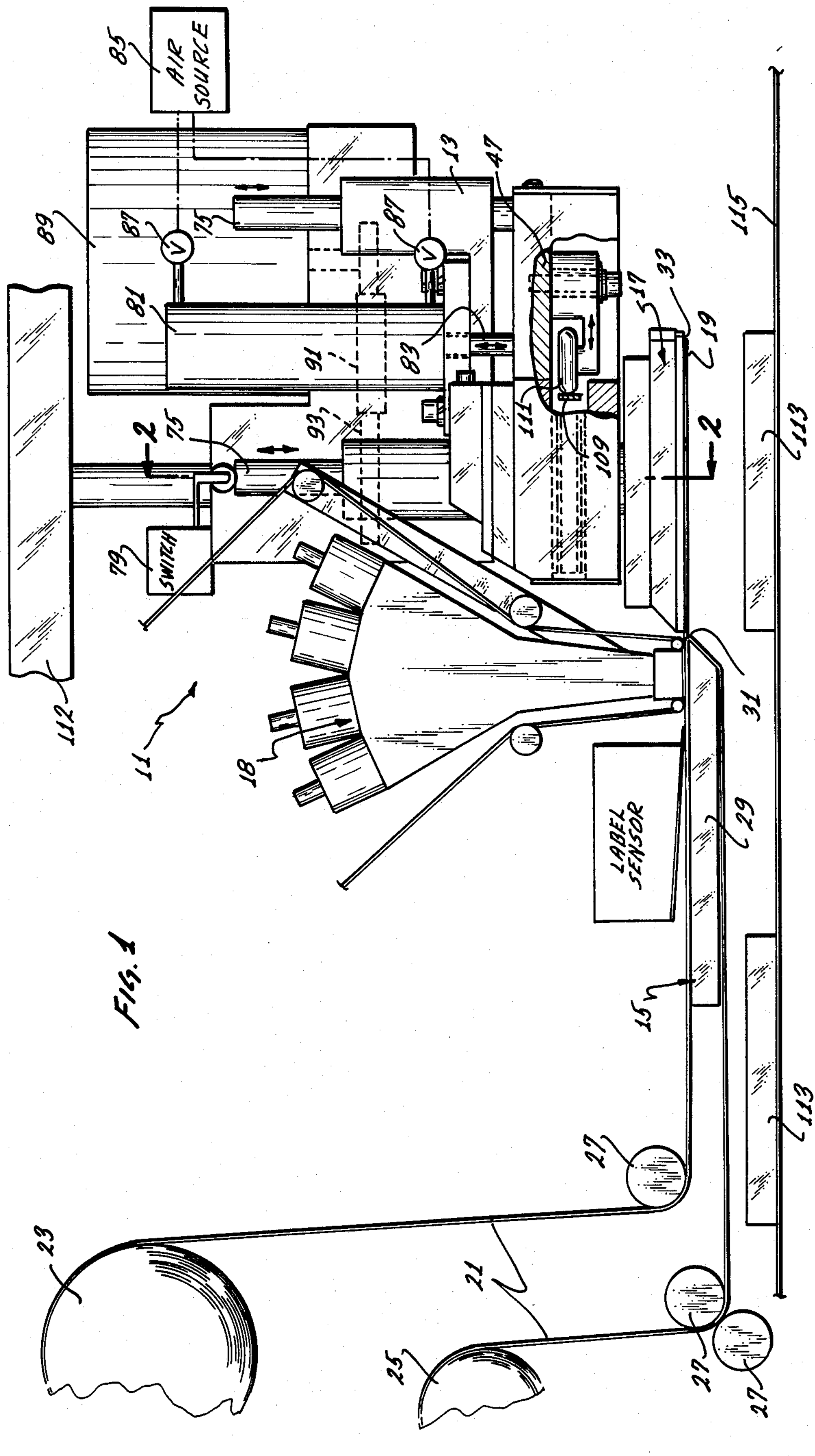
FIG. 1 is a side elevational view in somewhat schematic form and partly in section showing a label applicator constructed in accordance with the teachings of this invention.

FIG. 1 shows a label applicator 11 which includes a supporting structure 13, label dispensing means 15 mounted on the supporting structure and a label receiver 17. The label applicator can also include an optional printer 18 mounted on the supporting structure 13.

Although the label dispensing means 15 can be of various different kinds, in the embodiment illustrated, the label dispensing means is adapted for use with pressure sensitive labels 19 carried by an elongated backing strip or web 21. The label dispensing means 15 includes a supply reel 23 on which a supply of labels 19 is wound, a take-up reel 25, a suitable number and arrangement of intermediate rollers 27 and a peeler bar 29. One of the rollers 27 is intermittently driven by a motor (not shown) to intermittently move the backing strip 21 from the supply reel 23 over a peeling edge 31 of the peeler bar 29 to the take-up reel 25. This sequentially removes the labels 19 from the backing strip 21 and moves them onto the label receiver 17 while the label receiver 17 is held stationary on the supporting structure 13. The printer 18 prints information on the label 19 while the label is supported on the peeler bar 29.

The label receiver 17 has a label receiving face 33 which faces downwardly onto which the label 19 is dispensed. The label receiving face 33, in the embodiment illustrated, is planar. Although the label receiver 17 can be of different constructions, in the form illustrated, it includes plates 35 and 37 (FIG. 2) held together by screws 39 and defining a chamber 41 between them. Passages 43 lead from the chamber 41 to the label receiving face 33.

The label receiver 17 is mounted on a carriage 45 which includes a body 47. A pulley 49 is rotatably mounted within one end of the body 47 by bearings 51 and a pulley 53 rotatably mounted within the other end of the body 47 by bearings 55. A linear splined bearing 57 is suitably pressed within and fixed to the pulley 53. The bearings 51 and 55 are retained in the body 47 by retainers 59 and 61, respectively, attached to the body, and the body 47 may be constructed of multiple components as may be necessary to permit assembly of the bearings 51 and 55 and the pulleys 49 and 53 into the body 47.

The pulley 49 includes a shaft or shaft portion 63 to which the label receiver 17 is suitably attached as by screws 65 extending through the plate 35. An axial passage 67 extends through the shaft 63 and the plate 35 to the chamber 41. The pulley 49 is mounted by the bearings 51 for rotation about an axis 69 (FIG. 3) which is coaxial with the passage 67. The axis 69 extends transversely to the label receiving face 33, and in the embodiment illustrated, is perpendicular to this face. A source 71 of vacuum and positive air pressure is coupled, in accordance with conventional practice, to the passage 67 through a header 73 which is suitably attached to the upper end of the body 47.

With this construction, the label receiver 17 can rotate with the pulley 49 about the axis 69 relative to the body 47. In addition, the label receiver 17 and the carriage 45 are mounted for movement together along a path between a label dispensing station or retracted position shown in full lines in FIG. 2 and a label applying station or extended position shown in dashed lines in FIG. 2. In the embodiment illustrated, the path is vertical, and the carriage 45 and the label receiver 17 reciprocate along the path.

Figure 2:
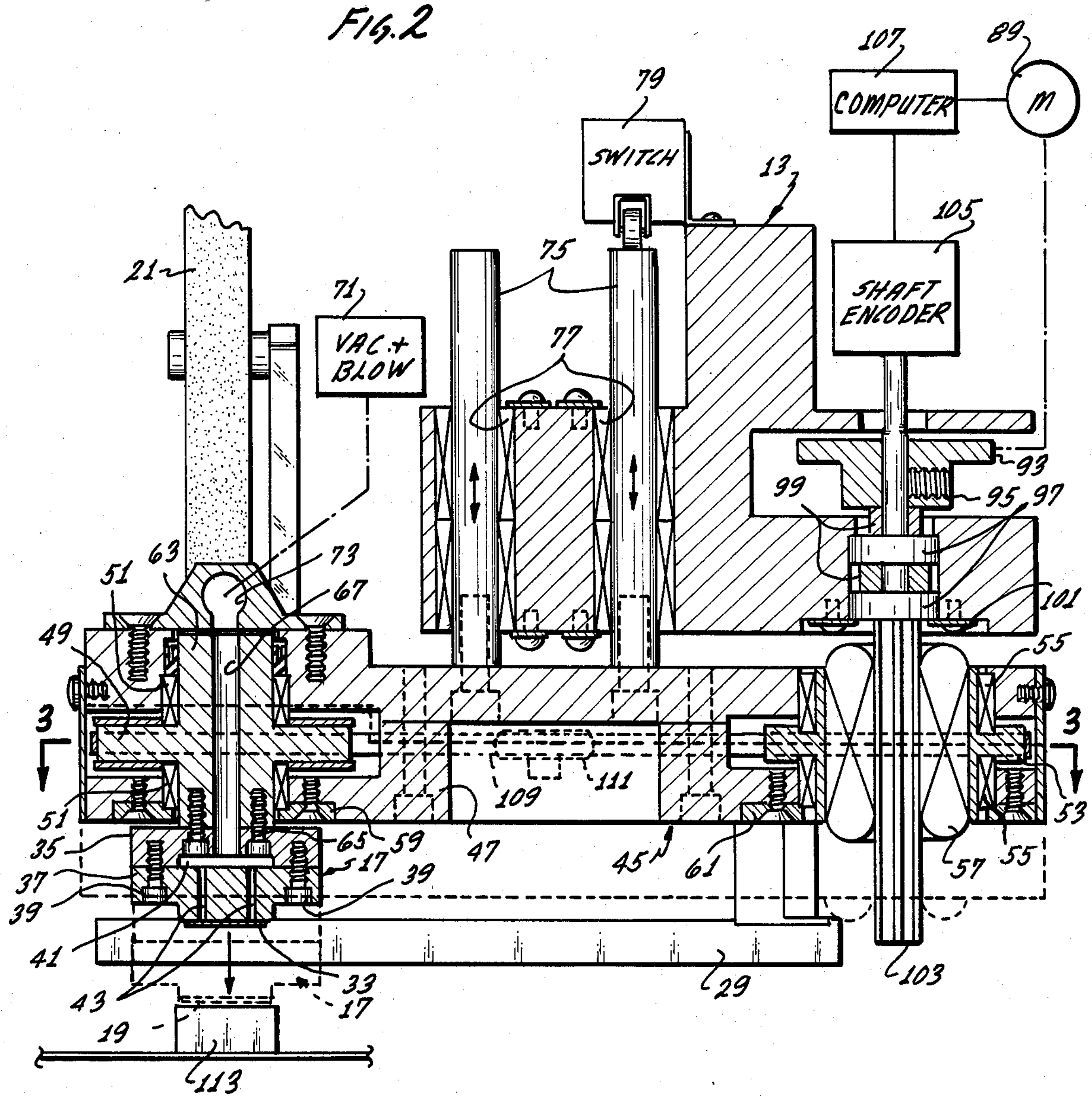
FIG. 2 is a sectional view taken generally along line 2—2 of FIG. 1.
Figure 3:
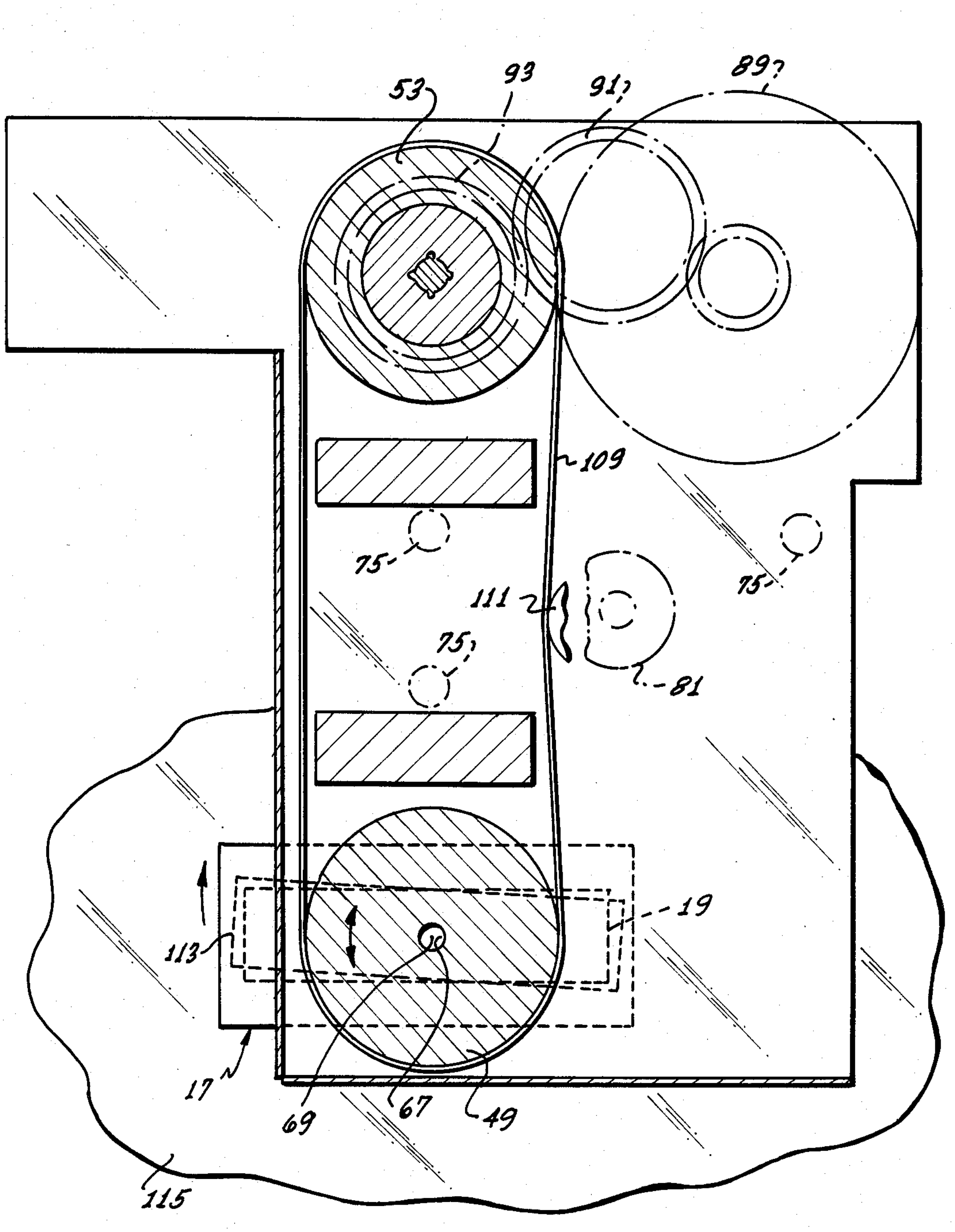
FIG. 3 is a sectional view taken generally along line 3—3 of FIG. 2 with some parts above line 3—3 being shown in phantom lines and with the label receiver about to be rotated to align the label with the article.

The carriage 45 can be simply and inexpensively mounted on the supporting structure 13 for reciprocating movement by guide rods 75 (three of which are shown in FIG. 3) suitably attached to the body 47 and bearings 77 (FIG. 2) carried by the supporting structure 13 and receiving the guide rods. A switch 79 mounted on the supporting structure detects movement of one of the guide rods 75 downwardly to thereby provide an indication that the carriage 45 and the label receiver 17 have left the label dispensing station.

The carriage 45 and the label receiver 17 are moved between the two stations by a motor which, in the embodiment illustrated, is a linear pneumatic actuator 81 (FIG. 1) which is coupled by a rod 83 to the body 47. The actuator 81 is supplied with compressed air from a source 85 through appropriate conduits and valves 87 in a conventional manner.

The means for rotating the label receiver 17 includes a motor 89 (FIGS. 1 and 3) carried by the supporting structure 13, an intermediate gear 91, a driven gear 93, and a shaft 95 to which the driven gear 93 is suitably affixed. The shaft 95 is rotatably mounted on bearings 97 carried by the supporting structure 13 (FIG. 2) and separated from each other and the gear 93 by spacers 99. The bearings 97 are retained by a retainer 101.

The lower portion of the shaft 95 is longitudinally splined to form a splined shaft or splined shaft portion 103. The splined shaft 103 is received within the linear splined bearing 57 so that the motor 89 can drive the pulley 53. Because the shaft 103 and the bearing 57 are splined, this driving connection between the motor 89 and the pulley 53 is maintained at the label dispensing station, the label applying station, and any position therebetween.

The motor 89 may be a stepping motor, and it can be controlled in various different ways to control the angular position of the splined shaft 103. For example, the angular position of the shaft 95 can be detected by a shaft encoder 105, and a signal representing shaft angle is fed to a computer 107 (FIG. 2). The computer 107 is programmed with the desired shaft angle for each article to be labeled, and so any difference between the desired angle for the article to be labeled and the angle determined by the shaft encoder is error. The error is represented by an error signal which is fed to the stepping motor 89 which drives the shaft 103 to make the actual and desired shaft angles equal. In this manner, the computer 107 can control the motor 89 in accordance with a program. This is useful when, for example, the angles through which the splined shaft 103 is to be turned changes in accordance with a pre-established program.

The means for rotating the label receiver 17 also includes an endless flexible member in the form of an endless timing belt 109 which extends around and between the pulleys 53 and 49 as shown in FIGS. 2 and 3. The belt 109 is tensioned by a tension roller 111.

The label applicator 11 is adapted to be mounted on a suitable X-Y traversing mechanism 112 (FIG. 1) over articles 113 to be labeled which are on a suitable supporting surface 115. Each of the articles 113 is positioned at known locations and has a known angular orientation. The traversing mechanism moves the label applicator 11 in sequence from one article to the next, and the computer 107 is programmed with the information regarding the angular orientation of each of the articles 113 to be labeled.

A label 19 can be dispensed onto the label receiving face 33 of the label receiver 17 in the usual manner by moving a predetermined length of the backing strip 21 over the peeling edge 31 of the peeler bar 29. This moves one of the labels 19 onto the label receiving face 33 at the label dispensing station. The label 19 is retained on the label receiving face 33 by vacuum pressure supplied from the source 71 through the passage 67, the chamber 41 and the passages 43.

The valves 87 are then operated to cause the linear actuator 81 to move the carriage 45 and the label receiver 17 from the upper, or label dispensing station, shown in full lines in FIG. 2 to the lower, or label applying station, shown in dashed lines in FIG. 2. The switch 79 provides a signal to the computer 107 indicating that the carriage and the label receiver 17 have begun their movement toward the label applying station. A portion of the means for rotating the label receiver 17, including the pulleys 49 and 53, the splined bearing 57 and the belt 109 moves with the carriage 45 to the label applying station while the motor 89, the gears 91 and 93 and the shaft 95 do not move with the carriage. At the label applying station, the label 19 and the label receiver 17 are out of contact with, but are in close proximity to the upper surface of the article 113.

During the descending movement of the label receiver 17, the computer 107 feeds a signal to the stepping motor 89 commanding the motor to take a predetermined number of steps to angularly orient the label 19 relative to the article 113 as desired. The motor 89 drives the label receiver 17 through the intermediate gear 91, the driven gear 93, the shaft 95 including the splined shaft 103, the pulley 53, the timing belt 109 and the pulley 49. In the illustrated embodiment, the label receiver 17 is rotated through only a few degrees clockwise as viewed in FIG. 3 to align the label 19 and the article; however, the label receiver can be rotated through any angle up to 180 degrees in either direction.

The label 19 is then applied to the article 113 by a blast of air under pressure from the source 71. Following this, the linear actuator 81 retracts to move the label receiver 17 and the carriage 45 to the label dispensing station, and during this time, the motor 89 returns the label receiver to an initial angular orientation for receiving the next label from the label dispensing means 15. The traversing mechanism 112 moves the label applicator 11 to the next article 113 where the process described above is repeated. The controls for dispensing the labels 19 and for reciprocating the carriage 45 and the label receiver 17 can be conventional. The motor 89 can be controlled manually or by means other than the computer 107.

Alternatively, the label applicator 11 can be held in a fixed position, and the articles 113 can be conveyed past the label applicator in a conventional manner. Thus, a traversing mechanism to move the label applicator is not essential.

By radially offsetting the shafts 95 and 63, adequate space is provided for the guide rods 75 which mount the carriage 45 for movement between the two stations. Also, this enables the peeling edge 31 of the peeler bar 29 to be located closely adjacent the label receiving face 33, and adequate space is provided for the printer 18 which prints on each label before it is dispensed. The splined shaft 103 allows the carriage 45 to descend with portions of the rotary drive train for rotating the label receiver 17.

Although an exemplary embodiment of the invention has been shown and described, many changes, modifications and substitutions may be made by one having ordinary skill in the art without necessarily departing from the spirit and scope of this invention.

I claim:

1. A label applicator for labeling an article at a label applying station, said label applicator comprising:

a supporting structure;

a movable label receiver;

means for mounting the label receiver on the supporting structure for movement along a path between a label dispensing station and the label applying station and for rotational movement about an axis to control the angular orientation of the label relative to the article at the label applying station;

label dispensing means for moving a label onto the label receiver at the label dispensing station;

means for releasably retaining the label on the label receiver;

means for moving the label receiver along said path between said stations;

means for rotating the label receiver about said axis whereby the label can be transferred to the article at the label applying station in the desired angular orientation; and said rotating means including a motor on the supporting structure which does not move with the label receiver to the label applying station and means for drivingly coupling the motor and label receiver whereby the label receiver can be rotated.

2. A label applicator as defined in claim 1 including means for holding the label receiver stationary at the label dispensing station relative to the supporting structure when the label dispensing means moves the label onto the label receiver.

3. A label applicator as defined in claim 1 wherein said path is linear and said axis is parallel to, or coincident with, said path.

4. A label applicator as defined in claim 1 wherein the label is releasably adhered to a strip and the label dispensing means includes a peeler bar mounted on the supporting structure and means for moving the strip over the peeler bar to remove the label from the strip and move it onto the label receiver.

5. A label applicator as defined in claim 1 wherein said label receiver has a label receiving face onto which the label dispensing means moves the label, said releasable retaining means releasably retains the label on the label receiving face, and said axis is generally transverse to said face.

6. A label applicator for labelling an article, said label applicator comprising:

a supporting structure;

a label receiver having a label receiving face;

means for mounting the label receiver on the supporting structure for rotational movement about an axis which is generally transverse to said label receiving face to control the angular orientation of the label relative to the article to be labeled;

label dispensing means for moving a label onto the label receiving face of the label receiver at the label dispensing station;

means for releasably retaining the label on the label receiving face;

means for rotating the label receiver about said axis whereby the label can be transferred to the article in the desired angular orientation;

said mounting means for said label receiver including a shaft coupled to said label receiver and means for mounting said shaft for rotation about said axis; and said rotating means including a motor carried by said supporting structure, a shaft driven by said motor and spaced radially from said shaft coupled to the label receiver, and means for drivingly coupling said shafts whereby said motor can rotate the label receiver.

7. A label applicator for labeling an article at a label applying station, said label applicator comprising:

a supporting structure;

a movable label receiver;

means for mounting the label receiver on the supporting structure for movement along a path between a label dispensing station and the label applying station and for rotational movement about an axis to control the angular orientation of the label relative to the article at the label applying station;

label dispensing means for moving a label onto the label receiver at the label dispensing station;

means for releasably retaining the label on the label receiver;

means for moving the label receiver along said path between said stations;

means for rotating the label receiver about said axis whereby the label can be transferred to the article at the label applying station in the desired angular orientation; and said mounting means including a carriage, means for mounting the label receiver on the carriage for rotational movement about said axis relative to the carriage, and means for mounting the carriage for movement to move the label receiver between stations.

8. A label applicator as defined in claim 7 wherein said rotating means includes a motor on said supporting structure, said carriage moves relative to the motor in moving the label receiver between said stations, and said rotating means includes means for drivingly coupling the motor and the label receiver even when the label receiver is out of the label dispensing station.

9. A label applicator as defined in claim 8 wherein said drivingly coupling means includes a shaft driven by the motor which is radially offset from said axis.

10. A label applicator as defined in claim 9 wherein said shaft extends through the carriage, said drivingly coupling means includes means carried by the carriage and cooperating with the shaft to allow said carriage to move relative to the shaft to move the label receiver between said stations and drive means including an endless flexible member for drivingly coupling the shaft and the label receiver whereby the label receiver can be rotated about said axis.

11. A label applicator as defined in claim 8 wherein at least a portion of said drivingly coupling means is carried by and moves with said carriage.

12. A label applicator for labeling an article at a label applying station, said label applicator comprising:

a supporting structure;

a carriage;

means for mounting the carriage on the supporting structure for movement between an extended position and a retracted position;

means for moving said carriage between said positions thereof;

a label receiver;

means for mounting the label receiver on the carriage for movement with said carriage between said positions and for rotational movement about a rotational axis relative to said carriage;

means for releasably retaining a label on the label receiver; and means for rotating the label receiver about said axis.

13. A label applicator as defined in claim 12 wherein said mounting means for said carriage includes at least one guide rod and said rotating means includes a motor on the supporting structure, said guide rod being generally between the motor and the label receiver.

* * * * *